(12) United States Patent
Lord et al.

(10) Patent No.: US 6,961,909 B2
(45) Date of Patent: Nov. 1, 2005

(54) SYSTEM FOR DISPLAYING A HIERARCHICAL DIRECTORY

(75) Inventors: Bob Lord, Colorado Springs, CO (US); Armando E. Sedillo, Colorado Springs, CO (US); John M. Fandel, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 666 days.

(21) Appl. No.: 09/755,740

(22) Filed: Jan. 5, 2001

(65) Prior Publication Data

US 2003/0063134 A1 Apr. 3, 2003

(51) Int. Cl.[7] .......................... G06F 3/00; G06F 17/00; G06F 17/30
(52) U.S. Cl. ................... 715/853; 715/854; 715/855; 707/104.1; 707/201
(58) Field of Search ................................ 715/853–855; 707/103, 200, 104.1, 201, 204; 345/853–855

(56) References Cited

U.S. PATENT DOCUMENTS

| | | | | |
|---|---|---|---|---|
| 5,701,137 A | * | 12/1997 | Kiernan et al. | 345/853 |
| 5,917,492 A | * | 6/1999 | Bereiter et al. | 345/854 |
| 5,923,328 A | * | 7/1999 | Griesmer | 345/854 |
| 5,977,971 A | * | 11/1999 | Guzak et al. | 345/853 |
| 6,028,602 A | * | 2/2000 | Weidenfeller et al. | 345/781 |
| 6,078,327 A | * | 6/2000 | Liman et al. | 345/854 |
| 6,237,006 B1 | * | 5/2001 | Weinberg et al. | 256/31 |
| 6,252,597 B1 | * | 6/2001 | Lokuge | 345/841 |
| 6,380,957 B1 | * | 4/2002 | Banning | 345/828 |
| 6,448,985 B1 | * | 9/2002 | McNally | 345/784 |
| 6,466,239 B2 | * | 10/2002 | Ishikawa | 345/850 |
| 6,559,871 B1 | * | 5/2003 | Brozowski et al. | 345/853 |

OTHER PUBLICATIONS

Microsoft Windows NT, version 4.0 (pp. 1–2, 1998).*

* cited by examiner

Primary Examiner—Kristine Kincaid
Assistant Examiner—Lê Nguyen

(57) ABSTRACT

A segmented-tree system for web browser display of a selected part of a tree-structured directory of hierarchically-related entities in a computer system. In the segmented-tree design of the present system, only the amount of information necessary to render the part of the tree in which the user is interested is transmitted from a server to the browser client. The server maintains information describing the complete tree, and it serves this information to the client in segments called 'views'. The tree state for a particular client is maintained in relatively small data strings transferred back and forth. The server is thereby enabled to handle tree requests from many clients without special synchronization or the storage of the client state. Because the client/server tree state is kept in sync as the user navigates and modifies objects in the tree, the browser display always represents the true state of the tree.

27 Claims, 9 Drawing Sheets

SYSTEM FOR DISPLAYING A HIERARCHICAL DIRECTORY

BACKGROUND OF THE INVENTION

1. Technical Field

The present invention relates generally to hierarchical directories in computer systems, and more particularly, to a system for providing a web browser display of a selected part of a tree-structured directory of hierarchically-related entities in a computer system.

2. Statement of the problem

There are presently several known "complete-tree" implementations for displaying a tree-structured directory of hierarchically-related entities via a web browser. These alternatives require blocks of information representing the entire tree to be sent from a server to a browser client. That is, the server sends everything necessary for the browser to render and maintain the complete tree as the user navigates around in it. These implementations typically involve the transfer of significant amounts of data from the server to the client.

One example of a complete-tree implementation uses Java applet controls. Numerous commercial and freeware Java applets exist from which a navigation tree can be implemented. However, these designs, while quite competent, do not integrate visually with the browser as nicely as other implementations, and may require large file transfers to the browser. As the number of tree objects increases, so does the loading time, and object numbers in the hundreds show significant performance hits.

Another example of a complete-tree implementation employs Javascript controls. Numerous commercial and freeware Javascript controls exist from which a navigation tree can be implemented. These designs integrate visually very well with the browser, but they may require large file transfers to the browser. As the number of tree objects increases, so does the loading time, and when a tree of interest includes hundreds of object numbers (or more), significant performance degradation occurs.

A further example of an existing implementation for displaying a tree-structured directory is a so-called "thin-client" display. This implementation requires that all tree processing be done on the server side. The entire tree is sent to the browser as raw HTML code with formatting embedded. While this implementation keeps the client-processing overhead down, the tree data transfer times are very large for large trees.

Solution to the Problem

The present invention overcomes the aforementioned problems of the prior art and achieves an advance in the field by providing a segmented-tree system for web browser display of a selected part of a tree-structured directory of hierarchically-related entities in a computer system. In the segmented-tree design of the present system, only the amount of information necessary to render the part of the tree in which the user is interested is transmitted from a server to the browser client. Detailed object information (such as a list of the node's children) is sent only for expanded nodes in the part of the tree being displayed. The server maintains information describing the complete tree, and it serves this information to the client in segments called 'views'. This method offers a number of advantages over the prior art, including the fact that it requires the transfer of relatively small amounts of data from the server to the web browser client, keeping loading time to a minimum. For trees served over a LAN, display response is virtually instantaneous. In addition, the present system scales very well. There is only a slight increase in server processing time for increased numbers of potentially displayable tree objects. Client-side and network processing time is essentially independent of the size of the tree.

In the system of the present invention, the tree state for a particular client is maintained in relatively small data strings transferred back and forth. This enables the server to handle tree requests from many clients without special synchronization or the storage of the client state. Because the client/server tree state is kept in sync as the user navigates and modifies objects in the tree, the browser display always represents the true state of the tree. Furthermore, modifications by other clients operating concurrently are incorporated in the display segments returned as a result of the other users' actions. In addition, the data and presentation layers of the tree can easily be kept separate, thereby providing ease of development and maintenance.

DETAILED DESCRIPTION

Figure 1:
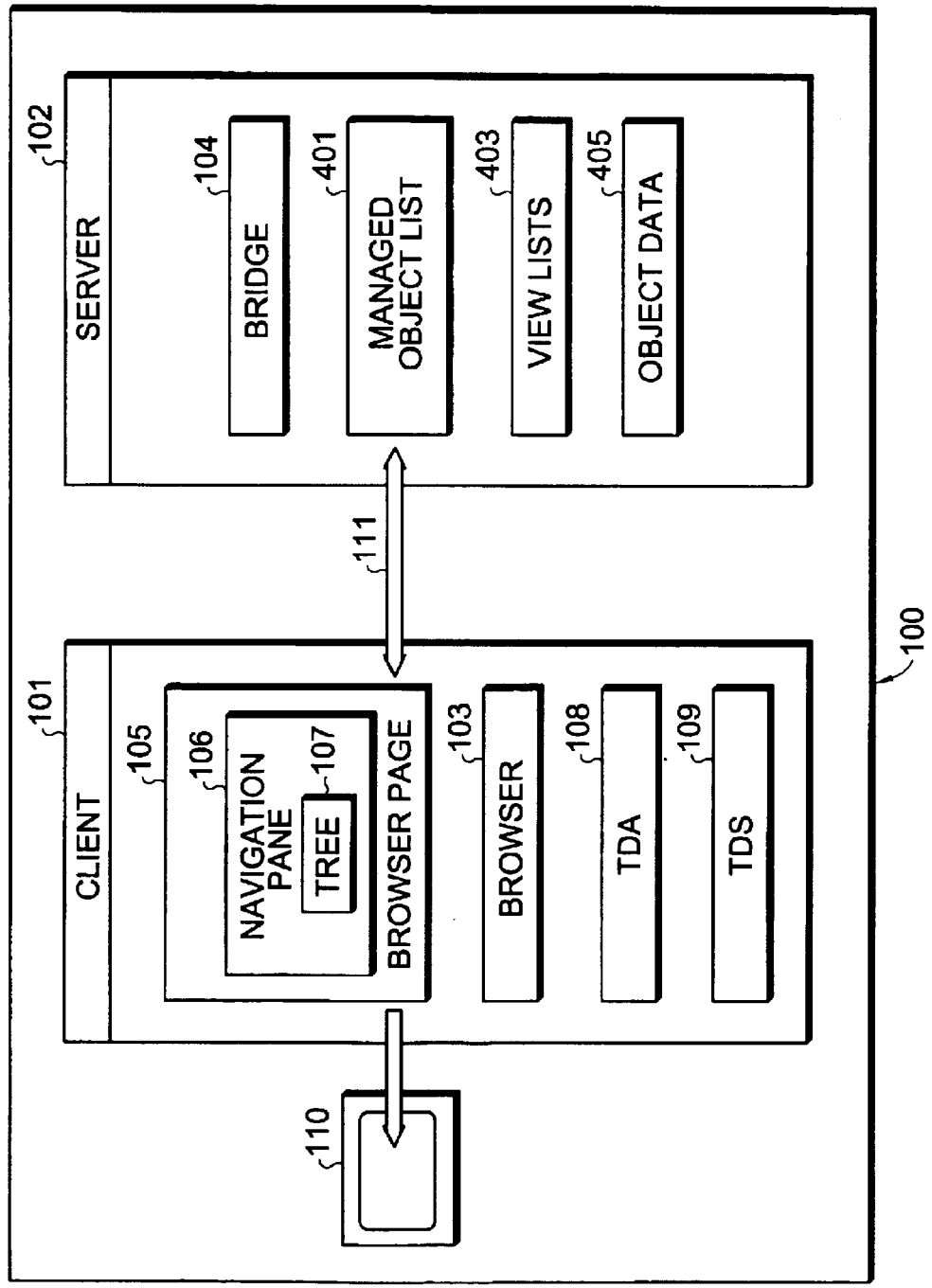
FIG. 1 is a diagram illustrating interrelationships between elements of the present system.

FIG. 1 is a diagram illustrating interrelationships between elements of the present system. As shown in FIG. 1, the present segmented tree system 100 comprises browser client subsystem ('client') 101, which is interconnected with a server 102 via a network (or other communication link) 111. Client 101 is typically a 'PC'-type computer system, which is connected to a display device 110. Client 101 includes a browser 103, which is typically a Windows Explorer® or Netscape® web browser. Client 101 also includes memory containing a browser page 105, which is displayed on display device 110. Browser page 105 includes a navigation pane 106, in which is contained a segment 107 of a navigable tree ('navigation tree'), through which a user of browser 103 'navigates' by clicking a device such as a mouse (not shown) on nodes in the navigation tree. Server 102 includes bridge software 104, which selectively sends segments 107 of the navigation tree to client 101, in response to requests effected by user navigation through the tree.

A description of terminology employed in this document is provided below.

Terminology

Object—a software entity representing a real-world or virtual entity. Objects have specific identities, operating parameters, and relationships to other objects that make them unique. The term is used in this document to more specifically indicate entities displayed on a user's screen, although objects may exist in other forms.

Navigation Tree ('tree')—a hierarchical, visual representation of the relationships among a group of objects. More specifically, the navigation tree is the entire system tree that is displayable in segments on a client system.

Managed object—an object that generally has one or more children; typically, an object that represents a network subsystem. The managed object is displayed via a client browser as part of a navigable tree representing the network.

Navigation Pane—a subset of the entire tree displayed as a navigable tree segment, stored as an HTML (view) frame on a client system.

Segment—a portion of an entire tree that can be displayed by a browser.

View—the 'segment' of a tree that is displayed by a browser.

View List—a list of objects in a tree specific to a managed object.

Cursor Point—the object that the user has selected by clicking on it.

Parent—an object that contains other objects in the tree. A parent object is directly related to specific, other objects, as far as the tree structure is concerned. The parent relationship is indicated by the match of an object's Unique Identifier (UID) property with another object's Parent Unique Identifier (ParentUID) property.

Folder—a specific type of parent object that exists only to contain and organize other objects.

Child—an object that is contained by a parent object. A given object is a child of any folder that contains it. A child object has a direct relationship with a parent object. The child relationship is indicated by the match of an object's Parent Unique Identifier (ParentUID) property with another object's Unique Identifier (UID) property.

Sibling—a specific object that has an indirect relationship with another object. The sibling relationship is indicated by the match of an object's Parent Unique Identifier (ParentUID) property with another object's Parent Unique Identifier (ParentUID) property.

Tree Descriptor String (TDS)—A string of data that describes the state of the complete tree from the client's perspective. The client starts out with an unexpanded view. As the user expands parts of the view the state of all user actions is contained in the TDS.

Tree Descriptor Array (TDA)—An array of data that contains property information on the data items that make up the tree segment to be displayed by the client.

The following section provides a description of the client navigation tree as processed by browser client subsystem 101 of the present system 100.

Navigation Tree

Figure 2:
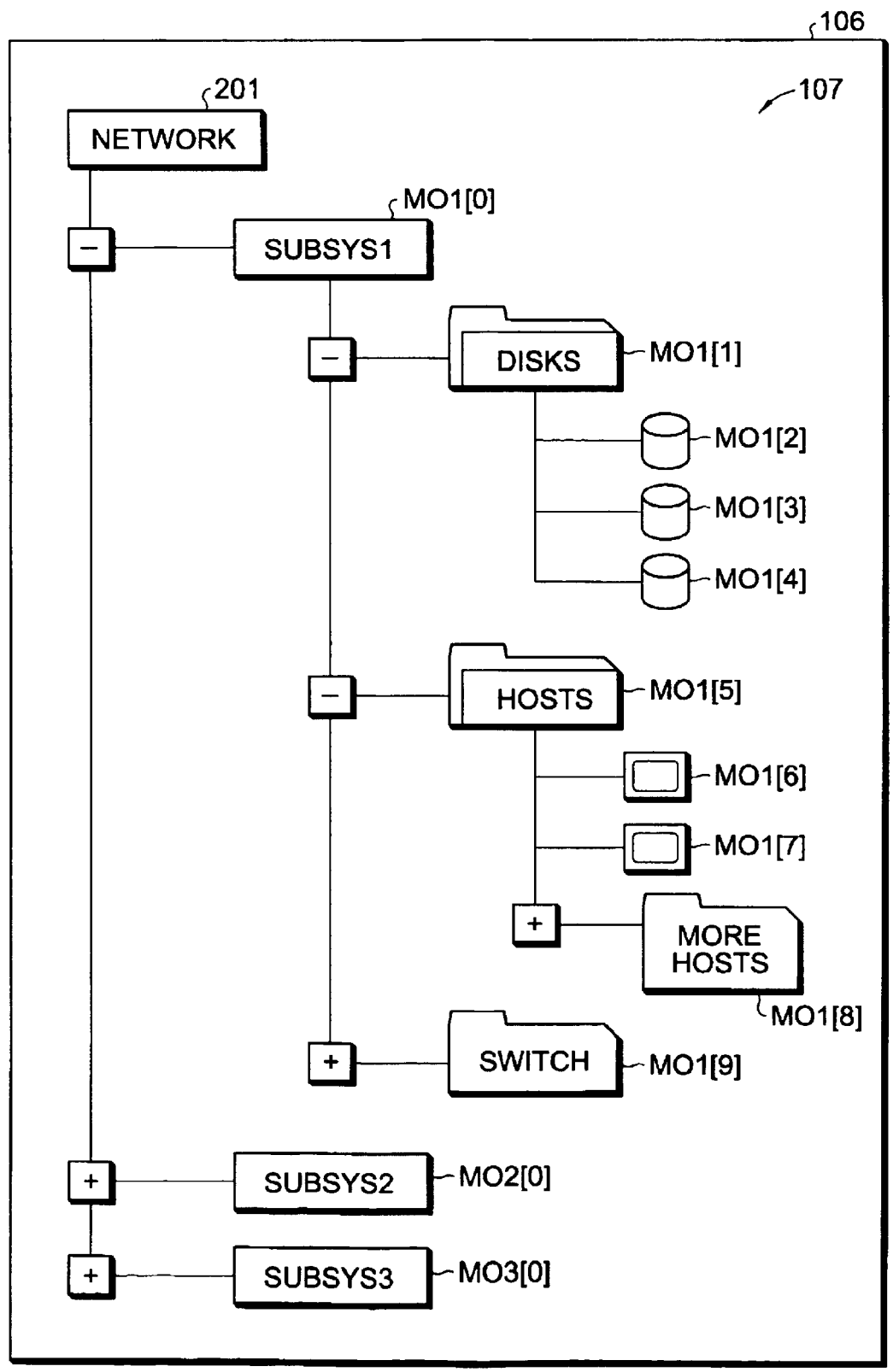
FIG. 2 is a diagram showing the layout of a typical navigation pane.

FIG. 2 shows the general layout of an exemplary 'navigation pane' 106 containing a displayed segment 107 ('view') of a navigation tree, from which the user selects and organizes objects. Assuming that the entire tree is too large to be displayed on display device 110, navigation pane 106 displays only a segment 107 of the tree. Navigation pane 106 is typically the leftmost frame on a browser page 105, but alternatively, it may be displayed in any suitable area of the page. The web browser 103 employed by the present invention uses a hierarchical tree structure to represent objects in the user interface. The present invention uses a novel method to display a user-selected part of the navigation tree. That is, only a segment of the whole tree is presented to the browser at a time. Because the number of objects in a given tree may run into the thousands, the present segmented design provides a significant performance improvement over the prior art. The present tree structure emulates a Windows Explorer® tree, but it is to be noted that the method of the present system is not limited to any particular tree structure implementation, and is operative with any type of browser that displays hierarchical data. An exemplary tree employed by the present system has the basic structure described below.

The 'Network' is the root object of the navigation tree, as indicated by the 'Network' icon 201 in FIG. 2. The root contains one or more 'managed objects' in the system's host hierarchy, shown in FIG. 2 as MO1[0] (represented by the icon 'Subsys1'), MO2[0] (icon 'Subsys2'), MO3[0] (icon 'Subsys3'). Each managed object may contain other objects such as folders, shown as MO1[1] (icon 'disks'), MO1[5] (icon 'Hosts'), MO1[8] (icon 'more hosts'), and MO1[9] (icon 'Switch'), each of which may contain 'folderized' objects. Each of the numbers in brackets is an index indicating the object's sequential visual position in the tree branch of the expanded managed object. Objects occupy nodes in the tree, therefore, each of the objects shown in FIG. 2 (e.g., MO1[0]–MO1[9]) is located at a node. There are two basic categories of tree nodes, container and leaf. Container nodes are expandable, and leaf nodes are not expandable. When a user clicks on an expandable (container) object in tree segment (view) 107, the object's properties are displayed in a content frame, which is well known in the art, and therefore not shown in FIG. 2. If the clicked-on object is a folder (a container node), the folder's tree branch is expanded in accordance with the method of the present system, and the object's properties are displayed in the content pane (not shown).

Implementing the Navigation Tree

The present exemplary navigation tree implementation comprises an array of data describing the objects in the displayed tree segment, and a string of data describing the state of the navigation tree. The root of the tree is always open. The root, as shown in FIG. 2, has a preset label value of "Network." The index value (that is, the integer value indicating its relative position in the entire tree) of the root is −1. The Unique Identification (UID) value of the root is all zeroes. A string of data called the 'tree descriptor string' (TDS) 109 describes the state of the part of the tree that is displayable at the client at a given time on display device 110. The TDS string is passed back and forth between the client and server, and synchronizes the two with respect to the client's tree state. An array of data, called the 'tree descriptor array' (TDA) 108 contains property information on the data items that make up the tree segment being displayed. The tree descriptor string and the tree descriptor array are described in detail below.

Managed Objects

Objects that represent displayable subsystems or other displayable entities are called 'managed objects' (these objects are also referred to as 'StorageCells', but the term 'managed object' is used in this document). Each managed object in the complete tree is assigned an object index number, as follows. The index of the root is −1; the 'object index' of any managed object is 0; the currently open managed object itself is the datum from which all other object indexes are assigned; therefore, the object index of any object contained by a managed object is its sequential position in the managed object's tree branch.

In an exemplary embodiment of the present system, managed objects have characteristics including the following:

each managed object has a unique UID value;

managed objects are the only allowable children of the root;

each managed object is displayed in its unexpanded state unless the managed object is selected;

there can be only one managed object selected (that is, 'open') at any time; when a closed managed object is opened, any currently open managed object will close;

each managed object is represented in the tree by one of a set of icons which indicate the operational condition of the managed object.

Since each managed object's index value is 0, managed objects are differentiated by their sibling number relative to the root. Depending upon how the tree objects are sorted, this number may change for any specific managed object. The first-displayed managed object is always sibling number 1.

Figure 3:
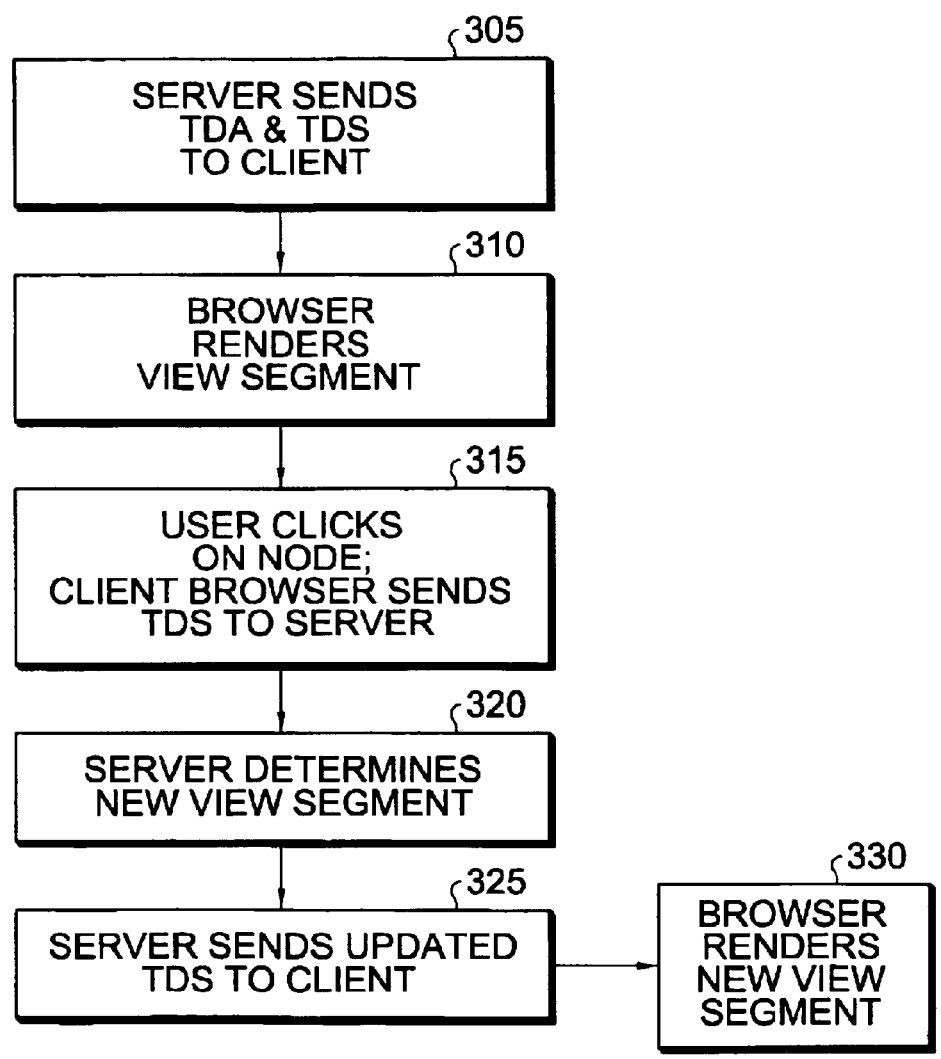
FIG. 3 is a is a flowchart showing exemplary steps performed in carrying out the general method of the present system.

FIG. 3 is a is a flowchart showing a series of exemplary steps which explain high-level operation of the present system. As shown in FIG. 3, at step 305, bridge program 104 in server 102 sends a tree descriptor array (TDA) 108 and a tree descriptor string (TDS) 109 (possibly null) to client browser 103. At step 310, browser 103 renders a view (on display 110) of the segment of the tree represented by TDA 108 and TDS 109. Next, at step 315, a user clicks on a displayed node which causes client browser 103 to send TDS 109, updated with user action information, to bridge program 104 in server 102 (hereinafter referred to simply as server 102). Upon receipt of the new TDS, at step 320, server 102 determines the next tree segment (view) 107 to be displayed based on the user action indicated in the TDS. Server 102 updates TDS 109 accordingly, at step 325, and sends the updated TDS back to the client browser 103. Finally, at step 330, browser 103 renders the new view in navigation pane 106 on display 110. Table 1, below, provides an example of a navigation tree showing all of the children of the managed object 'Subsys 3'. The information necessary to represent a complete tree is stored in data storage accessible to server 102, as opposed to being stored in client system 101, thus avoiding the consumption of a potentially large amount of storage space in client system 101, as well as reducing the amount of data (unnecessarily) transferred from server 102 to client 101.

TABLE 1

Navigation Tree (Server Side)

```
Index
-1   Network
 0    |—Subsys 1
 0    |—Subsys 2
 0    |—Subsys 3
 1    |    |—Virtual Disks
 2    |    |    |—Folder A
 3    |    |    |    |—VD1
 4    |    |    |    |   |—Active
 5    |    |    |    |   |—Snap 1
 6    |    |    |    |—VD2
 7    |    |    |    |   |—Active
 8    |    |    |    |   |—Snap 1
 9    |    |    |—Folder AA
10    |    |    |    |—VD11
11    |    |    |    |   |—Active
12    |    |    |    |   |—Snap 1
13    |    |    |    |—VD12
14    |    |    |    |   |—Active
15    |    |    |    |   |—Snap 1
16    |    |    |—Folder B
17    |    |    |    |—VD1
18    |    |    |    |   |—Active
19    |    |    |    |   |—Snap 1
20    |    |    |    |—VD2
21    |    |    |    |   |—Active
22    |    |    |    |   |—Snap 1       <—— Cursor
23    |    |—Presentations
24    |    |    |—Folder A
25    |    |    |    |—Host 1
26    |    |    |    |—Host 2
27    |    |    |    |—Host 3
28    |    |    |    |—Host 4
29    |    |    |—Folder B
30    |    |    |    |—Host 1
31    |    |    |    |—Host 2
32    |    |    |    |—Host 3
33    |    |—Hardware
34    |    |    |—Loop 1
35    |    |    |—Loop 2
 0    |—Subsys 4
```

Table 2, below, shows a segment 107 of the navigation tree in Table 1 that is transferred from server 102 to client 101 to provide a navigation pane 106 viewable (as a 'view') via browser 103 on display 110. Note that the data shown in Table 2 is a subset of the information in Table 1. More specifically, the sample tree segment in Table 2 includes only managed objects and the objects which are contained in presently open containers, that is, the objects included in nodes which are presently expanded in the client view. Thus, it can be seen that only a portion of the potentially displayable tree need be transmitted to, and stored on, client system 101 to display any given tree segment. In the present example, managed object 'Subsys3' is the currently expanded managed object. The server-side navigation tree in Table 1 shows all of the children of the managed object 'Subsys 3', starting with the node labeled 'Virtual Disks', which has an object index value of 1. Since each of the sub-nodes under 'Subsys 3' is not presently expanded, the client-side tree segment shown in Table 2 does not include all of the children of the 'Subsys 3' object. Even though 'Folder B' immediately follows 'Folder A'(which has an object index value of 2), 'Folder B' has an object index value of 16, since there are 13 presently unexpanded (and undisplayed) children 'between' 'Folder A' and 'Folder B', as indicated in Table 1.

TABLE 2

Navigation Tree Segment (Client Side)

```
Index
-1    Network
 0    |— + Subsys 1
 0    |— + Subsys 2
 0    |— - Subsys 3
 1    |    |— -Virtual Disks
 2    |    |    |— +Folder A
16    |    |    |— -Folder B
17    |    |    |    |— +VD1
20    |    |    |    |— -VD2
21    |    |    |    |    |—Active
22    |    |    |    |    |—Snap 1    <—— Cursor
23    |    |— -Presentations
24    |    |    |— +Folder A
29    |    |    |— +Folder B
33    |    |— +Hardware
 0    |— + Subsys 4
```

The Tree Descriptor Array

The tree descriptor array (TDA) 108 contains information on each tree object in the tree segment 107 that is to be displayed. The TDA 108 contains the following fields, as shown in the example in Table 3, below:

Index1—an integer indicating the relative position of the object in the tree at which the view segment starts (the 'v' field index in the TDS Structure Table, below);

Index2—the 'object index', which is an integer indicating the relative tree position of this object from its managed object (or the value "−1" if the object is the root object);

Data type—a string indicating the type of this object. There are two basic types of tree nodes, container and leaf. Container nodes are expandable; leaf nodes are not expandable;

Condition—a string indicating the operational condition of this object;

State—a string indicating the state of this object, which is indicated as "open" if a container node is presently expanded, "closed" if not expanded, and "end", if the displayed object is located at the end of a branch and cannot be further expanded;

Label—A user-friendly text string to be displayed near the screen icon for this object; and UID—A 40-character string indicating the Universal IDentifier of this object.

Exemplary information including data types, conditions, and states that can be displayed in the tree descriptor array are shown in the following example in Table 3, which corresponds to the navigation tree segment example shown above.

TABLE 3

Tree Descriptor Array Example
Number of array elements <16>

| Index1 | Index2 | Type | Condition | State | Label | UID |
|---|---|---|---|---|---|---|
| [0] | −1 | root | "ok" | open | "Network" | 000 . . . 000 |
| [1] | 0 | man. obj. | "ok" | closed | "Subsys 1" | 000 . . . 001 |
| [2] | 0 | man. obj. | "ok" | closed | "Subsys 2" | 000 . . . 002 |
| [3] | 0 | man. obj. | "ok" | open | "Subsys 3" | 000 . . . 003 |
| [4] | 1 | folder | "ok" | open | "Virtual Disks" | 000 . . . 004 |
| [5] | 2 | folder | "ok" | closed | "Folder A" | 000 . . . 005 |
| [6] | 16 | folder | "ok" | open | "Folder B" | 000 . . . 006 |
| [7] | 17 | vd | "ok" | closed | "VD1" | 000 . . . 007 |
| [8] | 20 | vd | "ok" | open | "VD2" | 000 . . . 008 |
| [9] | 21 | vdactive | "ok" | end | "Active" | 000 . . . 009 |
| [10] | 22 | vdsnap | "ok" | end | "Snap 1" | 000 . . . 010 |
| [11] | 23 | folder | "ok" | open | "Presentations" | 000 . . . 011 |
| [12] | 24 | folder | "ok" | closed | "Folder A" | 000 . . . 012 |
| [13] | 29 | folder | "ok" | closed | "Folder B" | 000 . . . 013 |
| [14] | 33 | hardware | "ok" | closed | "Hardware" | 000 . . . 014 |
| [15] | 0 | man. obj. | "ok" | closed | "Subsys 4 | 000 . . . 015 |

The Tree Descriptor String

The tree descriptor string (TDS) 109 is an ASCII text string sent between the client and the server as a variable. TDS 109 completely describes the state (folders open or closed) and some of the structure of the displayed segment of the navigation tree. The TDS represents the hierarchical structure of the open containers in the part of the tree that is being displayed. Braces are used to delineate the hierarchical structure. The Navigation Tree Segment shown above in Table 2 illustrates this process. The open container nodes in the above tree segment can be represented as follows:

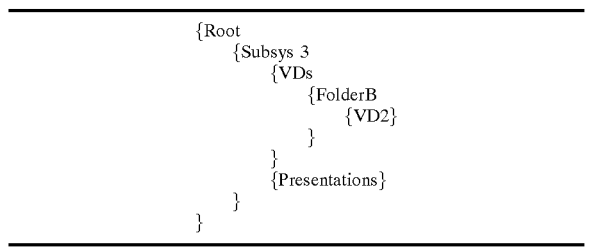

The TDS string sequence for the above tree segment is:

{Root{Subsys3{VDs{FolderB{VD2}}}{Presentations}}}

The complete TDS string is formed as shown in the following section.

Forming the Tree Descriptor String

There are three basic fields in the tree descriptor string (TDS), the 'v' field, the 'p' field, and the '{ }' fields. The 'v' field is an integer indicating the relative position of the object in the tree at which the view segment starts. The 'p' field is an integer indicating the relative position of the user-selected object in the tree; this is the cursor position. The '{ }' fields include a sequence of structures describing expanded nodes in the tree. Several other parameters are included in the TDS to specify the indexes, numbers of children, and sibling numbers of each open container. Table 4, below, describes the complete TDS structure for the navigation tree segment in Table 2.

TABLE 4

TDS Structure

| Field | v | P | { } |
|---|---|---|---|
| Substring | - Index Number-an integer indicating the relative position of the object in the tree at which the view segment starts.<br>Delimiter = "u"<br>(The values "−1" = Root object, and "0" = the open managed object.)<br><br>- UID associated with the data item at that index. Hex format.<br>Delimiter = "p" | - Index Number-an integer indicating the relative position of the user-selected object in the tree.<br>Delimiter = "u"<br>- UID associated with the data item at that index. Hex format.<br>Delimiter = "{" | Sequence of { . . . } structures describing expanded nodes in the tree.<br>Delimiter = "{" or "}"<br><br>Each structure is formed as follows:<br><br>- Object Index Number (MOindex) - an integer indicating the position of the object relative to its managed object.<br>Delimiter = "t" if Root object;<br>Delimiter = "s" if other object.<br>- Sibling Number-an integer representing the sibling number of this object under its parent.<br>Delimiter = "t" |

TABLE 4-continued

TDS Structure

| Field | v | p | { } |
|---|---|---|---|
| Example | v-1u10000000000000000002 | p22u200000000000000003 | - Total Children-an integer representing the total number of children under this object. Delimiter = "{" or "}" {-1t4{0s3t3{1s1t2}{16s2t2} ... }} |

```
v <Viewindex>
   u <Viewuid>     p <Pointerindex>
                      u <Pointeruid>   {<Rootindex>t<#managed objects>
                                         {<MOindex>s<siblings#>t<#children>
                                           {<MOindex>s<siblings#>t<#children>
                                             {<MOindex>s<siblings#>t<#children>
   ↓    ↓           ↓    ↓                 ↓        ↓        ↓
```

TDS    v-1u1000000 ... 0002p22u2000 ... 00003{-1t4{0s3t3{1s1t2}{16s2t2}{20s2t2}{23s2t2}}}

Managed Object List

Figure 4A:
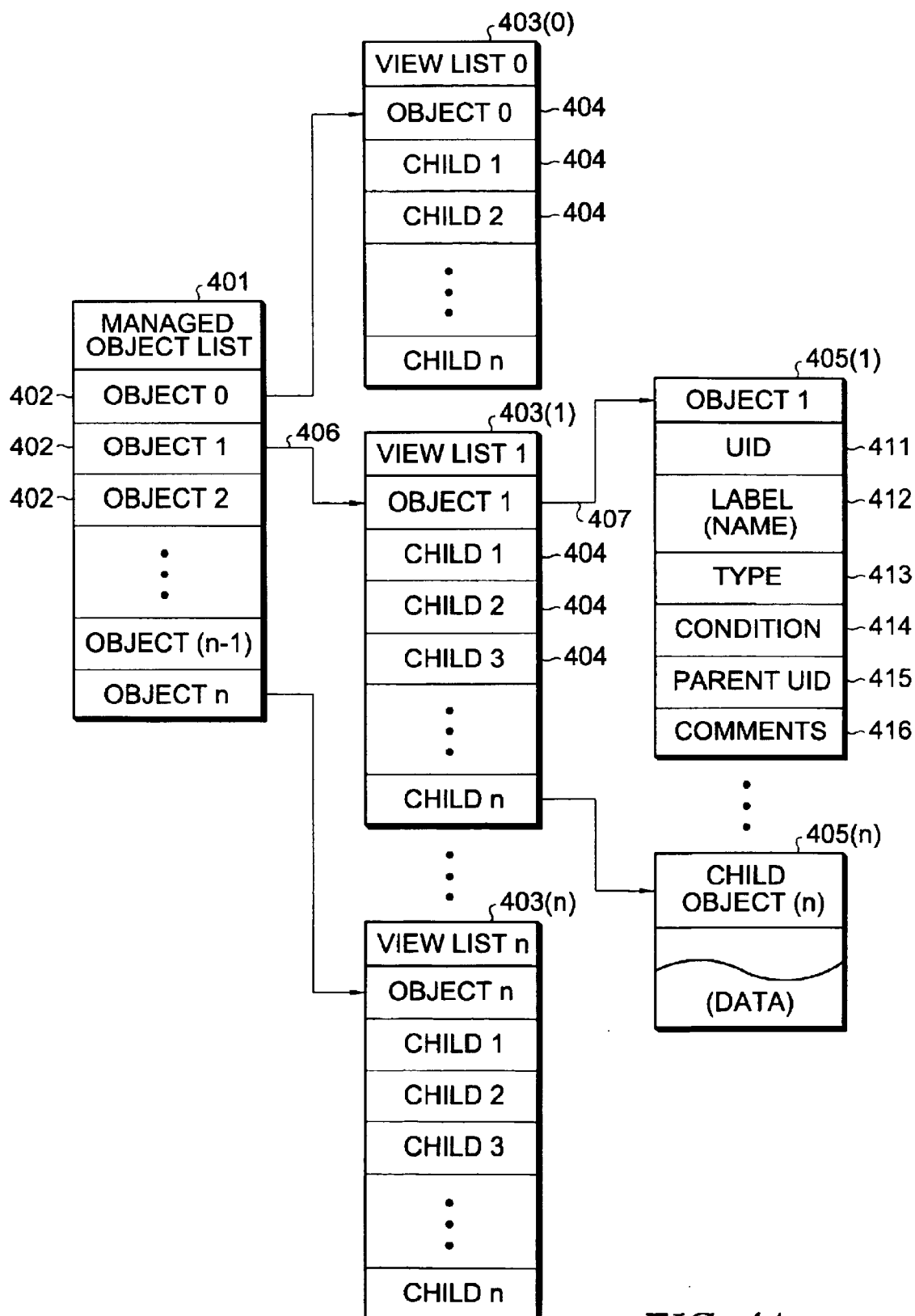
FIG. 4A is a diagram showing interrelationships between data structures used in implementing the present system.

FIG. 4A is a diagram showing interrelationships between several data structures used in implementing the present system. The present system employs, for each client, a managed object list 401 that contains, for each managed object, a list of pointers 402, each of which points to a view list 403(*) for the object represented by the particular pointer 401. Each view list 403 contains a list of pointers 404, each of which point to an object data record 405 for the object represented by the particular pointer 404. Each object data record 405 contains data for the respective object including the object's UID 411, label (name) 412, type 413, condition 414 (open or closed), and the object's parent's UID 415. Managed object list 401, view list 403, and data records 405 are stored in a data storage device accessible to server 102, and therefore do not consume storage space in client system 101.

In the example shown in FIG. 4A, the pointer for object 1 in managed object list 401 points (as indicated by arrow 406) to the view list 403(1) for object 1. Each view list 403 contains an entry for (a pointer to) each of the children of the managed object represented by the particular view list. In FIG. 4A, it can be seen that the entry for object 1 in view list 403(1) points (as shown by pointer 407) to the object data record 405(1) for object 1, and the entry for object n in the same view list 403(1) points to the object data record 405(n) for object n.

Figure 4B:
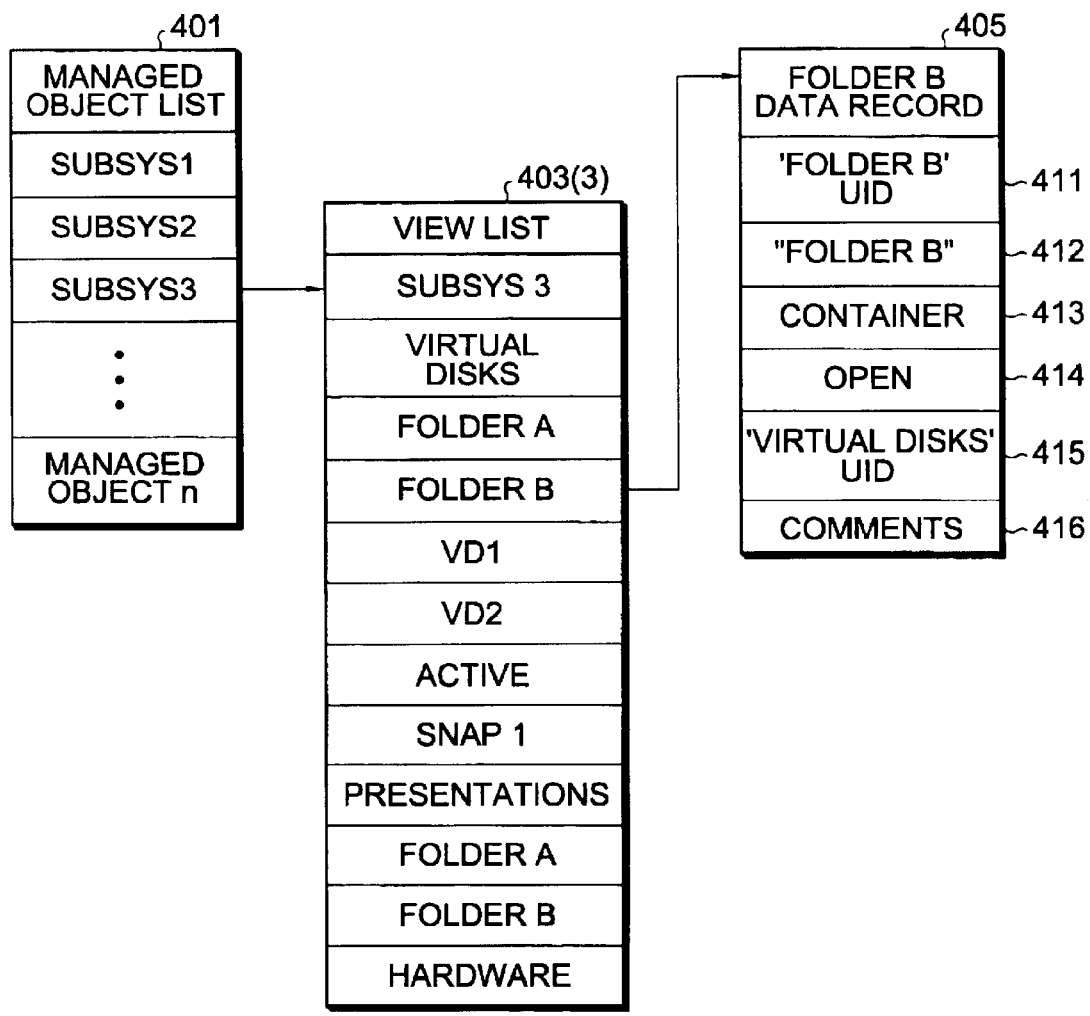
FIG. 4B shows a managed object list and one view list corresponding to the tree structure shown in the navigation tree segment of Table 2.

FIG. 4B shows a managed object list 401 and one view list 403 corresponding to the tree structure shown in the sample navigation tree segment in Table 2. As shown in FIG. 4B, managed object list 401 contains entries for each object in the sample tree segment, as well as for the other managed objects in the client/server network. In the present example, it can be seen that 'Subsys 3' in the managed object list points to a corresponding view list 403(3). View list 403(3), in turn, contains a list of pointers to each of the children of the managed object 'Subsys 3' that are presently expanded in the client view displayed in navigation pane 106. Each entry in the view list points to a data record for the corresponding object. In the present example, the entry for 'Folder B' in view list 403(3) points to the data record 405 for Folder B which contains information corresponding to certain of the information fields contained in the tree descriptor array 108 for the present navigation tree. Folder B's data record contains the UID for the parent of Folder B (stored in field 415), specifically, the UID for the 'Virtual Disks' object. In addition to providing an indication of the parent object, the UID contained in field 415 also facilitates a determination of which objects in the view list are siblings, since each sibling will have the same parent UID.

Client Side Tree Processing

This section describes an exemplary algorithm used to render the view of the tree specified by the tree descriptor array (TDA) 108 and tree descriptor string (TDS) 109. To aid in the explanation of the algorithm, Javascript syntax is used to represent the TDA and TDS for the sample navigation tree segment in Table 2.

Javascript Data Structures for the Sample Navigation Tree Segment

```
//The TDS variable:
var tds="v-1u10000000000000000002p22u200000000000000003{-
1t4{0s3t3{1s1t2}{16s2t2} {20s2t2}{23s2t2}}}";
function treeObject(treeIndex,treeType,treeCondition,treeState,treeLabel,treeUID)
{
    this.treeIndex = treeIndex;
    this.treeType = treeType;
    this.treeCondition = treeCondition;
    this.treeState = treeState;
    this.treeLabel = treeLabel;
    this.treeUID = treeUID;
}
//The TDA for Sample Navigation Tree Segment
//The tda is the action tag <!.treetda>
var tda=new Array( );
```

-continued

Javascript Data Structures for the Sample Navigation Tree Segment tda[0]=new treeObject(-1,"root","ok","o","Network","00000000000000000000");
tda[1]=new treeObject(0,"mo","ok","c","Subsys 1","00000000000000000000");
tda[2]=new treeObject(0,"mo","ok","c","Subsys 2","00000000000000000000");
tda[3]=new treeObject(0,"mo","ok","o","Subsys 3","00000000000000000000");
tda[4]=new treeObject(1,"foldervd","ok","o","Virtual Disks","00000000000000000000");
tda[5]=new treeObject(2,"foldervd","ok","c","Folder A","00000000000000000000");
tda[6]=new treeObject(16,"foldervd","ok","o","Folder B","00000000000000000000");
tda[7]=new treeObject(17,"vd","ok","c","VD1","00000000000000000000");
tda[8]=new treeObject(20,"vd","ok","o","VD2","00000000000000000000");
tda[9]=new treeObject(21,"vdactive","ok","e","Active","00000000000000000000");
tda[10]=new treeObject(22,"vdsnap","ok","e","Snap 1","00000000000000000000");
tda[11]=new treeObject(23,"folderhost","ok","o","Presentations","00000000000000000000");
tda[12]=new treeObject(24,"folderhost","ok","c","Folder A","00000000000000000000");
tda[13]=new treeObject(29,"folderhost","ok","c","Folder B","00000000000000000000");
tda[14]=new treeObject(33,"hardware","ok","c","Hardware","00000000000000000000");
tda[15]=new treeObject(0,"mo","ok","c","Subsys 4","00000000000000000000");

It should be noted that the pseudocode set forth below provides an example of how the client view may be rendered, but other program flow sequences may instead be effected to implement the method of the present system. In all of the algorithms set forth below, V (which corresponds to the 'v' field in the TDS Structure in Table 4 above) is an integer indicating the relative position of the object in the tree at which the view segment 107 starts, and P (which corresponds to the 'p' field in Table 4) is an integer indicating the relative position of the user-selected object in the tree (i.e., the cursor position). The following algorithm is executed by the client browser 103.

Pseudocode for Client Tree Rendering Algorithm

Validate the structure of the tree descriptor string (TDS) 109 by checking for an equal number of opening and closing braces. Check also that there is one more "t" character than "s" characters.

Parse the TDS for the index value of V and assign it to an integer variable: (vIndex=-1).

Parse the UID of V and assign it to a string variable: (vUID="10000000000000000002").

Parse the index value of P and assign it to an integer variable (pIndex=22).

Parse the UID of P and assign it to a string variable: (pUID="20000000000000000003").

Create a new integer array, nodeIndex[ ]. Parse the TDS for open braces, each of which represents an open tree container node. For each open brace encountered, create a new array entry containing the index value that immediately follows the brace's position in the TDS: (nodeIndex[i]= <index number>). Assign the total number of expanded nodes (that is, the length of the nodeIndex array) to an integer variable (nodeIndex.length).

Create a new integer array, nodeIndex[ ]. Parse the TDS for the character "s" (each of which represents the beginning of each expanded node's sibling number.) For each "s" encountered, create a new array entry containing the sibling number that immediately follows the s's position in the TDS. (nodeSibling[i]=<sibling number>). Because the first expanded node, the root, has no parent, it has no sibling number. Set its nodeSibling[0] number to zero.

Create two new integer arrays, nodeChildren[ ] and nodePA[ ]. Parse the TDS for the character "t" (each of which represents the beginning of each expanded node's total number of children.) For each "t" encountered, create a new array entry containing the total number of children that immediately follows the t's position in the TDS: (nodeChildren[i]=<total number of children>).

As each "t" is encountered, check the brace character immediately following the total children field. If the brace is an opening brace, create a new "preadjustment" entry in the nodePA[] array containing the value True. If the brace is a closing brace, create a new entry in the second array containing the value False.

"Preadjustment" is the process of adjusting the total children values of each expanded node to account for expanded children below it. That is, if a node has 4 children, and the next expanded node is the $3^{rd}$ sibling, its total children value is "preadjusted" to 4−3=1, indicating that there is one sibling under the $3^{rd}$ one to display.

Set up a FOR loop to move through the nodeSibling [ ], nodeChildren[ ], and node PA[ ] arrays starting at each array's second entry and ending at its last entry. In each cycle of the loop (that is, at each expanded node) check the nodePA[ ] value of the _previous_ entry (that is, nodePA [i−1]). If the previous PA value is True, "preadjust" the _previous_ total children value by subtracting the sibling number of the current entry from it: (nodeChildren[i−1]= nodeChildren[i−1]-nodeSibling[i])

When the preadjustment process is complete, four arrays exist:

(1) nodeIndex[ ], which contains the indexes of each expanded node;

(2) nodeSibling[ ], which contains the sibling numbers of each expanded node;

(3) nodePA[ ], which contains the preadjustment Boolean values for each expanded node, and (4) nodeChildren[ ], which contains the preadjusted total number of children of each node.

Set up a FOR loop to read the tree descriptor array (TDA) 108 entries from tda[0] to tda[tda.length−1]. Each entry's index value is then tda[i].treeIndex.

Create a temporary, new array, nodeDisplay[ ] to contain the graphic items representing one tree object and to be "drawn" to the navigation tree.

Initialize a variable gtzChildren to 0.

Set up a FOR loop to move through the nodeChildren[ ] and nodeIndex[ ] arrays with an incrementor range of from j=0 to j=(nodeIndex.length −1) (that is, one less than the total number of expanded nodes in the TDS). In each loop, check each entry of nodeChildren[ ] and nodeIndex[ ] and:

If the value of nodeChildren[j]>0, set variable gtzchildren=j and continue checking in this loop iteration.

If the value of nodeChildren[j]=0, skip to the next iteration of the FOR loop.

If the value of tda[i].treeIndex equals −1, store a null in nodeDisplay[j] and continue with the next iteration of the loop.

If the value of tda[i].treeIndex is greater than the value of nodeIndex[j], store a "|" character in nodeDisplay[i] and continue to the next iteration of the FOR loop.

If the value of tda[i].treeIndex is not equal to −1 and is less than or equal to the value of nodeIndex[j], return to the last nodeChildren[ ] entry with a value greater than 0. This entry is found at nodeChildren[gtzChildren].

Subtract 1 from the value of that children number (nodeChildren[gtzChildren]−1). If the result is greater than 0, replace the last "|" with a "|−", otherwise replace it with a "L" character. The version of the following characters appropriate for either a container or a leaf node should be used: ⊞ ⊟ ⊞ ⊟.

After the graphic correction is made, continue with the next iteration of the FOR loop.

Write a line of graphics represented by the contents of the nodeDisplay[ ] and tda[ ] arrays to the navigation tree frame, as follows.

Write the appropriate connecting lines, represented by the contents of the nodeDisplay[ ] array, to the left of the object in the navigation tree frame.

Write the icon for this object type into the navigation tree frame. Use the icon appropriate to the operational condition and state of the object.

Construct the appropriate HTML anchor tag for the object. Write the tag, along with the object label, next to the object icon in the navigation tree frame.

If the UID of the object matches the UID contained in the variable pUID, adjust the display to highlight this object.

Delete the nodeDisplay[ ] array.

Repeat the previous steps in the FOR loop initiated above until all entries in the TDA have been processed.

Write the appropriate scroll and page buttons into the navigation tree frame. Do not display scroll or page up buttons if the tree view point (the object at the top of the view) is the system. Do not display scroll or page buttons if the last item in the view is the last item in the tree.

[End of Client Tree Rendering Algorithm]

In an exemplary embodiment of the present system, in addition to the TDA 108 and TDS 109, the following variables are used by the client browser 103 in rendering the navigation tree:

```
<!.schandle>    //UID of open Managed Object(required for link
                // formation)
Action tag takes the form: var schandle="xxxxxxxxxxxxxxxxxx";
<!.treeend>     //Boolean flag indicating that the current view
is              //the last view in the tree (required to
display or      //not display scroll/page buttons for
views near      //end of tree)
Action tag takes the form: var treeEnd=true;
```

Link Formation

Client Javascript constructs tree object links in the form:
<a href=javascript:treeClick(linkparameters)>Tree Object Icon and Label</a>

The function treeClick( ) dynamically creates a call to reload the navigation pane 106 as described below. The basic structure of the function itself is as follows:

```
function treeClick(navurl,contenturl)
{
    //this method loads the Navigation Pane
    parent.navpane.location.href=navurl;
}
```

Function Calls Targeted to the Navigation Pane

ISAPI calls, with the navigation pane as the target, load the navigation pane 106 with a new tree segment 107. There are two such actions of interest to the present description, depending on the displayed object on which the user clicks:

| User Action | Function Call |
| --- | --- |
| Click tree container object | /Fusion/Treecontainer?schandle=<schandle>&index=<objectindex>&uid=<objectuid>&tds=<tds> |
| Click tree leaf object | /Fusion/TreeLeaf?schandle=<schandle>&index=<objectindex>&uid=<objectuid>&tds=<tds> |

Server Side Tree Processing

This section provides a description of the processing that needs to be done by the bridge (the server) to support the information requirements of the client 101 in offering a navigation pane 106 to a user.

General User Actions

While a client is using the navigation pane 106 of the client view, any action taken within that pane can be generalized to several unique actions. Each action requires the client 101 to send a unique request to the server 102 along with a unique set of arguments. For each user action the server must follow a particular algorithm in order to process that user action correctly and return the correct data to the client application that will result in an updated view in the navigation pane 106. In this section, the user action of expanding (and contracting) a node is identified along with exemplary algorithms, a list of assumptions, the related server actions, and an example of the format of a client request.

Expandable Node Click

The user action identified as an "expandable node click" occurs, for example, when a user moves the cursor to a specific area of the navigation pane, which causes an expandable node to be highlighted, and double-clicks the left mouse button. An expandable node is defined a node in the navigation tree that has children. This type of node is identified by an expander box at the end of its tree branch. Double-clicking on this type of node implies a request to display the properties associated with this node in the content pane (not discussed herein) as well as to expand the node to view its children if the node has yet to be expanded. If the node has already been expanded, double-clicking on the node causes the node to be contracted, effectively eliminating the view of any nodes hierarchically below the node.

Format Example

/Fusion/TreeContainer&newP=<index value>&newPUID=<uid>&TDS=<TDS> (This call builds the new View Frame)

Server Actions (1) Build a new view frame (the HTML navigation pane 106).

(2) Update the TDS 109 (new V, new P and expansion or contraction of new P).

(3) Reload the frame set.

Assumptions

It assumed that the UID supplied with this command will be that of an expandable node; also, if the node supplied was previously expanded it will contract unless it is the root node, which always stays open (effectively a no-op); and the reloading of the frame set constitutes an action separate from those described in the algorithm below.

Figure 5:
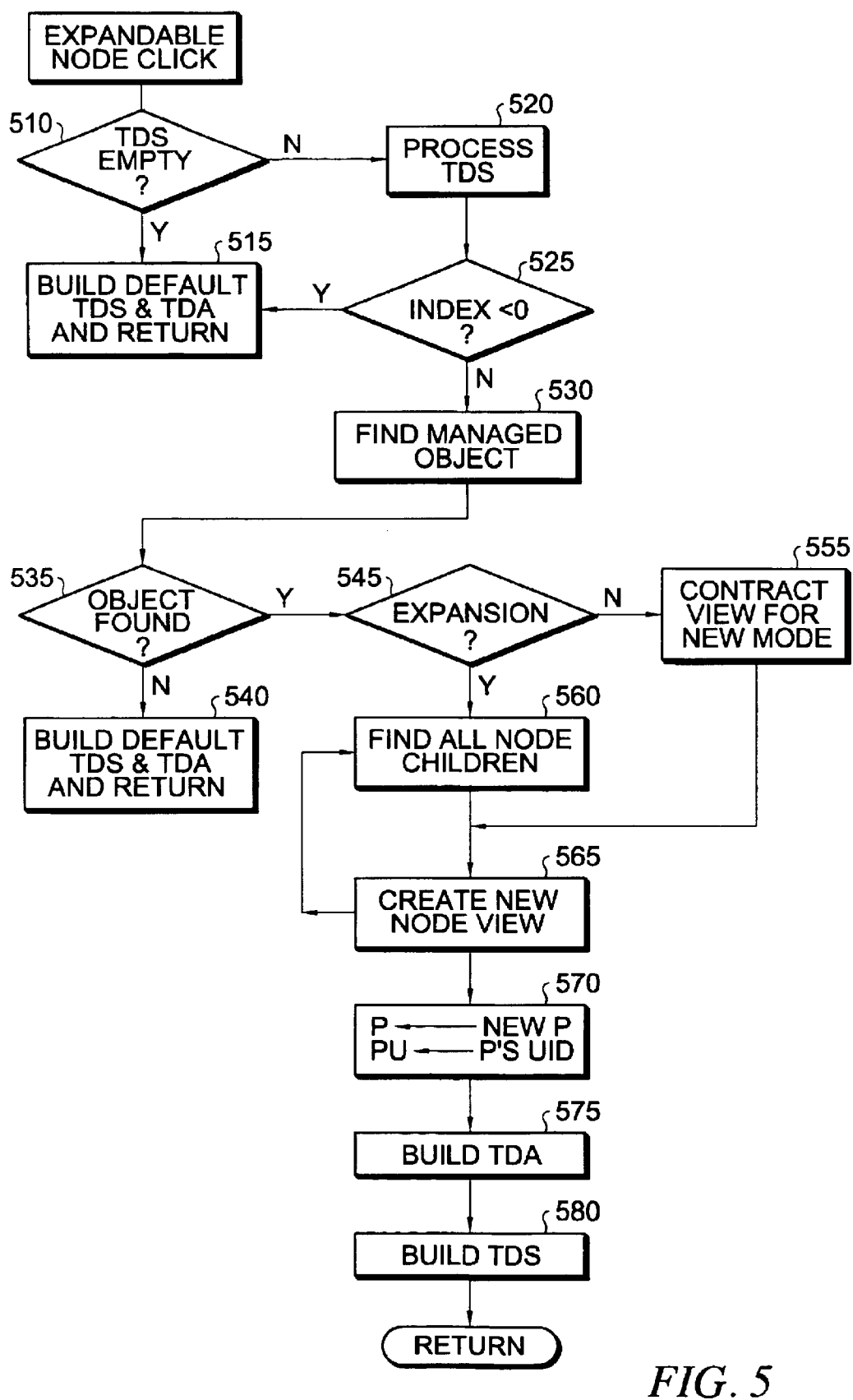
FIG. 5 is a flowchart showing exemplary steps performed in executing an expandable node click.

FIG. 5 is a flowchart showing exemplary steps performed in executing an expandable node click. In the description below, the step numbers correspond to blocks in the flowchart, some of which are repetitively executed, as indicated by arrows which flow in both directions between certain of the blocks. The Find All Children function referenced below finds all of the children that have a given managed object's UID as their ParentUID in the view list

403. The Find All Siblings function finds all the siblings of a given managed object. The Find All Siblings and Find All Children functions are straightforward implementations of well-known tree navigation techniques and thus are not detailed herein.

In the following algorithm, as indicated above, P is an integer indicating the relative position of the object in the tree at which the tree segment 107 (view) starts, and V is n integer indicating the relative position of the user-selected object in the tree (i.e., the cursor position). The updated tree descriptor string 109, the new index value P (New P), and the UID of the clicked node (New PUID) are received as arguments to the process. It should be noted that the present algorithm assumes that only one managed object may be expanded in a client view at any one time.

Expandable Node Click Algorithm

Step 510

Determine whether the tree descriptor string (TDS) 109 is empty.

Step 515

If the TDS is empty, create the default TDS. To do this, set the value of New P to −1 and the value of New P's UID to 0. Replace the value in V with the value of New P and replace the value in VU with the value of New P's UID. This will effectively move New P to the top of the new view 106.

Get a list of all of the managed objects (moList) from a system object broker or other system utility (a 'managed object broker' ('mob') is used in the presently described embodiment) (moList=mob->getManagedObjectList( )). Set EN to 1. Set I[0] to −1. Set S[0] to 0. Set T[0] to the size of the managed object list 401. Set PA[0] to TRUE.

Build the tree descriptor array (TDA) 108 per the Building the Tree Descriptor Array algorithm described below.

Build the TDS per the Building the Tree Descriptor String algorithm described below. Return with success.

Step 520

If it is not empty, process the TDS per the Processing the Tree Descriptor String algorithm described below.

Step 525

Verify that the index received as an argument to this process (New P) is greater than or equal to zero. If the index is less than 0, return to Step 515. Otherwise (if the index is either greater than or equal to 0), decide if the index received as an argument to this process (New P) is greater than zero.

Step 530

If New P is equal to 0 then this is either the first expansion of a managed object or the contraction of a previously expanded managed object. In either case a determination of which managed object to expand or contract must be made. Using the managed object list 401 obtained from executing the Processing the Tree Descriptor String algorithm, sequence through the list comparing the UID supplied as an argument (New PUID) to this request with the UID of each managed object.

Step 535

Decide if the UID received as an argument to this process (New PUID) was found in the managed object list 401.

Step 540

If no managed object's UID matches the supplied UID, build the default TDS and TDA using the instructions in Step 515. Return with success.

Step 545

If a match is found initialize a temporary variable (TV) to the index of the managed object in the managed object list plus one.

Check the value of EN (the count of indexes in the TDS).

If EN is equal to 1 this is an expansion of the managed object. Otherwise, continue at Step 545A, below (represented by block 545 in FIG. 5).

Step 560

Set the value of I[EN] to zero. Set the value of S[EN] to TV. Get the view list 403 (the list of children of the managed object) for the managed object by indexing down the managed object list 401 (moList) by the value of S[EN] adjusted down by one (moView=(moList->at(S[EN]−1))->getview( )). Find all the children with the managed object's UID as their Parent UID in the view list 403 using a Find All Children function.

Step 565

Set T[EN] to the count of the number of children found. Set PA[EN] to false. Set PA[EN−1] to TRUE. Increment EN by one.

Step 555

If EN is greater than 1 compare the value of S[1] to TV. If there is a match then this is a contraction of New P.

Step 565

Set the value of EN to one. Set PA[EN−1] to false.

Step 560

If New P is equal to zero and the Value of EN is greater than one and the value of S[1] is not equal to TV then a different managed object may already be expanded. Before expanding the managed object referred to by New P, we must contract the currently expanded one. To do this simply set EN to 1. Then proceed with the expansion of New P: Set the value of I[EN] to zero. Set the value of S[EN] to TV. Get the view list 403 for the managed object indexed by the value of S[EN] adjusted down by one (moView=(moList->at(S[EN]−1))->getView( )). Find all the children with the managed object's UID as their ParentUID in the view list 403 using a Find All Children function.

Step 565

Set T[EN] to the count of the number of children found. Set PA[EN] to false. Set PA[EN−1] to TRUE. Increment EN by one.

Proceed to Step 570.

Step 545A

If New P is greater than 0, then use the managed object list 401 to get the view list 403 (moView) for the managed object indexed by the value of S[1] adjusted down by one (moView=moList->at(S[1−1])).

Confirm the existence of the Expandable Node (New P) in the selected view list 403 using New P and New PUID to locate the node by its UID.

If the Expandable Node was not found, build the default TDS and TDA using the instructions in Step 515. Return with success.

Once the Expandable Node is located in the view list 403, it must be determined whether the user request is for an expansion or a contraction. Check the value of EN (the count of indexes in the TDS). If EN is equal to 2 this is the first expansion within a managed object. Therefore the New P's index will not be found in the current TDS. Otherwise, set an Extra Variable (EV) to 3 and a Boolean Variable FOUND to FALSE. While the value of EV is less than the value of EN, compare the value of New P with the value of I[EV]. If they are equal set FOUND to TRUE. Otherwise, if New P is greater than I[EV] compare EV to EN. If EV is less than EN increment EV and repeat this process.

If EN is equal to 2, then go to Step 560. If the value of FOUND is FALSE, proceed to Step 560A (shown as Block 560 in FIG. 5). Otherwise, FOUND=TRUE, and proceed with the following step.

Step 555

This is a simplified case of contraction. If a contraction occurs in the middle or beginning of other expansions a more rigorous algorithm must be employed to limit the contraction properly.

Step 565

Set EN to equal EV. Set PA[EN−1] to false. Proceed to Step 570.

Step 560

If EN is equal to 2 this is the first expansion within a Managed Object. Find all the children with the managed object's UID as their Parent UID in the view list 403 using a Find All Children function. Verify that New P is in this list of children [i.e., in the View list]. If it is not, error recovery is performed. Otherwise set I[EN] to New P. Presuming that the list of children is in ascending numerical order, determine the ordinal value of New P in the list. Set S[EN] to this value. Find all the children of New P in the view list 403 using a Find All Children function.

Step 565

Set T[EN] to the count of the number of children found. Set PA[EN] to false. Increment EN by one.

Step 560

If the value of New P is greater than the value of I[EN−1], set I[EN] to New P. Find all the siblings of New P in the view list 403 using the Find All Siblings function. Presuming that the list of siblings is in ascending numerical order, determine the ordinal value of New P in the list. Set S[EN] to this value. Find all the children of New P in the view list 403 using a Find All Children function.

Step 565

Set T[EN] to the count of the number of children found. Set PA[EN] to false. Increment EN by one.

Step 560A

If the value of New P is less than the value of I[EV] initialize another temporary variable to the value of EN (ATV=EN). While ATV is greater than TV, I[ATV]=I[ATV−1], S[ATV]=S[ATV−1], T[ATV]=T[ATV−1], PA[ATV]=PA[ATV−1], ATV=ATV−1. Set I[EV] to New P. Find all the siblings of New P in the view list 403 using a Find All Siblings function. Presuming that the list of siblings is in ascending numerical order, determine the ordinal value of New P in the list. Set S[EV] to this value. Find all the children of New P in the view list 403 using the Find All Children function.

Step 565

Set T[EV] to the count of the number of children found. Set PA[EV] to false. Increment EN by one.

Step 570

Replace the value in P with the value of New P and replace the value in PU with the value of New P's UID.

Replace the value in V with the value of New P and replace the value in VU with the value of New P's UID. This will effectively move New P to the top of the new view.

Step 575

Build the TDA per the Building the Tree Descriptor Array algorithm described below.

After building the TDA, verify that New P is part of the list. If it is not, perform error recovery.

Step 580

Build the TDS per the Building the Tree Descriptor String algorithm.

Return with success.

[End of Expandable Node Click Algorithm]

Common Algorithms

When dealing with indexes into the vector of a complete managed object tree, objects are related to each other. Some of these relationships can easily be identified. However, the type of relationship is not always obvious. For instance, two adjacent entries in the vector could have a parent/child relationship, a sibling/sibling relationship, or no relationship. However, in terms of viewable objects, nodes having no other relationship may have a view relationship. Types of view relationships include view/view next, view next/view, view/skip and skip/view depending upon the user action. To determine these relationships, three common algorithms are employed: processing the tree descriptor string, building the tree descriptor array, and building the tree descriptor string. These algorithms are described below.

Processing the Tree Descriptor String

Figure 6:
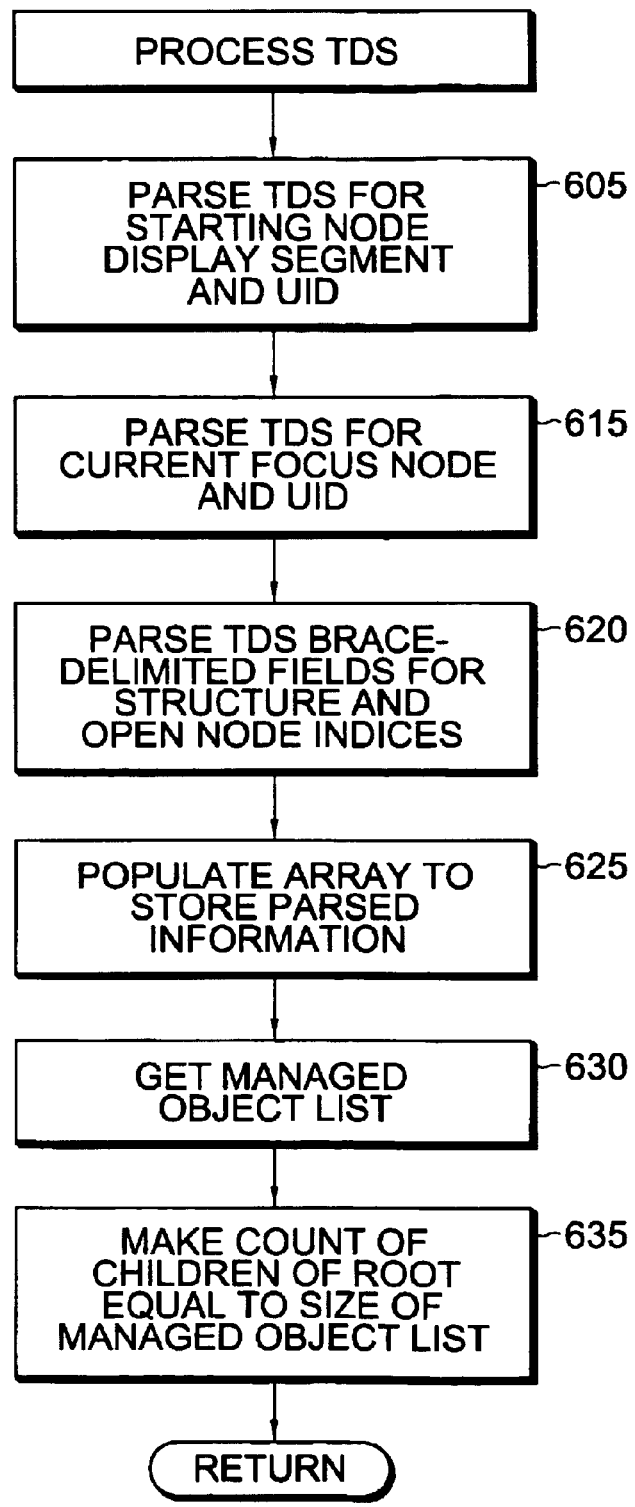
FIG. 6 is a flowchart showing exemplary steps performed in processing a tree descriptor string.

FIG. 6 is a flowchart showing exemplary steps performed in processing a tree descriptor string. The steps listed below are illustrated by the blocks appearing in FIG. 6. Prior to execution of step 605, a counter variable (EN) is initialized to zero.

Step 605

Parse V index value from the tree descriptor string (TDS) 109 and assign it to an integer variable (V=<index_value>).

Parse V's UID value from the TDS and assign it to a UID variable (VU=<VUID>).

Step 615

Parse P index value from the TDS and assign it to an integer variable (P=<index_value>).

Parse P's UID value from the TDS and assign it to a UID variable (PU=<PUID>).

Step 620

Parse the first open brace and root index and assign the root index to an integer variable (I[EN]=−1). Parse T and T value and assign the T value to an integer variable (T[EN]=<T_value>). Since there is no S value set an integer variable to zero (S[EN]=0).

Step 625

Parse the next character. If it is a closing brace a boolean variable is set to FALSE (PA[EN]=False), the counter variable is incremented by one (EN=EN +1) and parsing is complete. If the character read is an opening brace a boolean variable is set to TRUE (PA[EN]=True) and the counter variable is incremented by one (EN=EN+1). Parsing continues with the next index value (I[EN]=<index value>), the S and the S value (S[EN]=<s value>), the T and the T value (T[EN]=<t value>). Parse the next character. If it is a closing brace a boolean variable is set to FALSE (PA[EN]=False) and the next character would be read. Characters continue to be read until the end of the string is reached or an opening brace is encountered. If the end of the string is reached the counter variable is incremented by one (EN=EN+1). Otherwise processing continues as specified at the beginning of this paragraph.

Step 630

Get the managed object list 401 (moList) from the system object broker or other system utility (scList=ob->getmanaged objectList( )) and compare the size of the list to the first T value (T[0]).

Step 635

If they are not the same replace the T value with the new count (if (T[0]!=moList->size( )) T[0]=moList->size( )).

[End of Processing The Tree Descriptor String]

Building the Tree Descriptor Array

Figure 7:
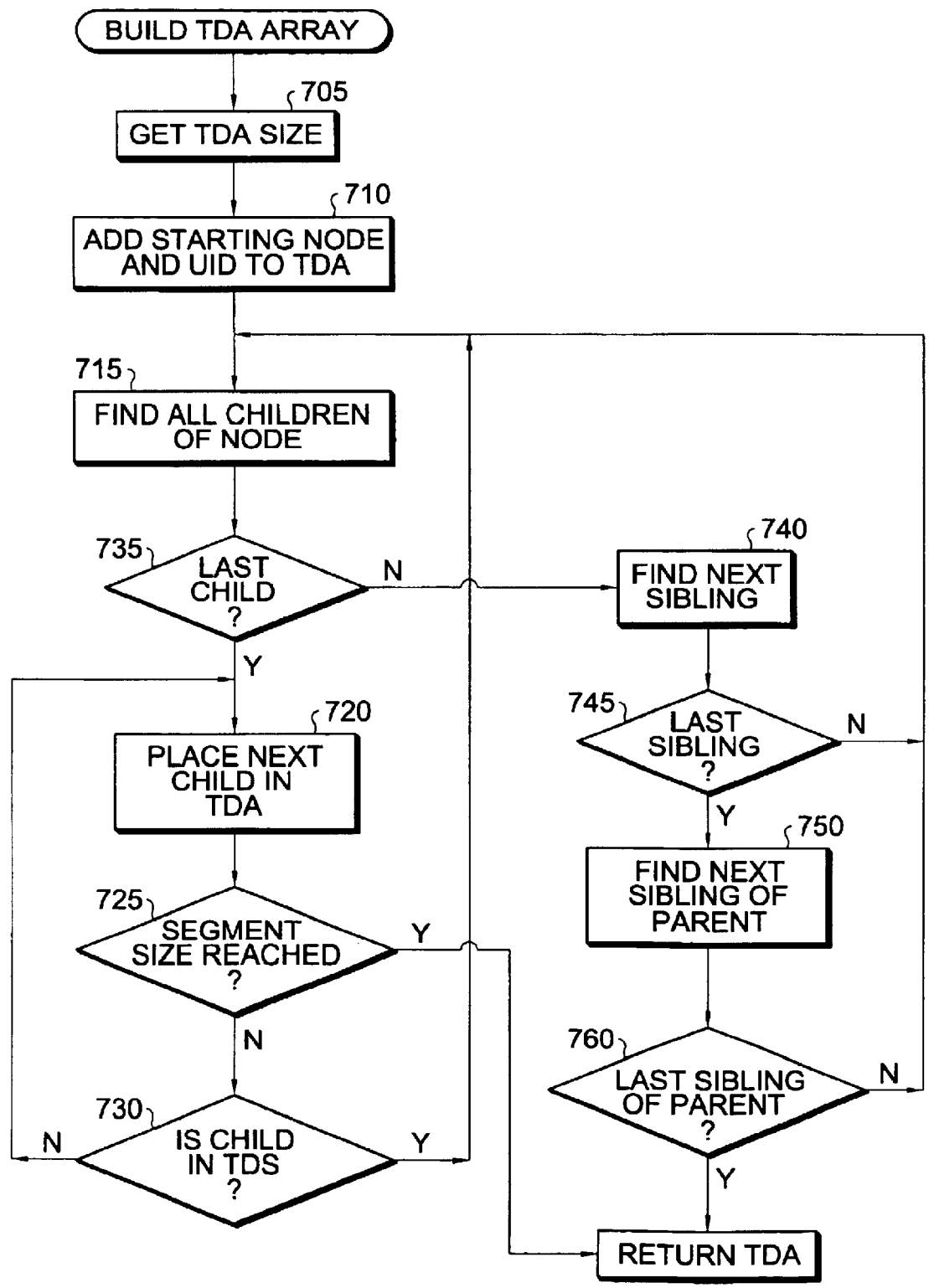
FIG. 7 is a flowchart showing exemplary steps performed in building a tree descriptor array.

FIG. 7 is a flowchart showing exemplary steps performed in building a tree descriptor array (TDA) 108. The steps listed below are illustrated by the blocks appearing in FIG. 7.

Step 705

First, determine the number of entries that the TDA will have. This is determined be a preset default or a user preference. Keep track of how many entries have been made to the list and compare it to how many are needed as an entry is added to the TDA.

Step 710

Start the TDA by adding a pointer to V.

Step 715

If V is equal to −1 (top of the tree) its children are represented by the list of managed objects (moList), so this list must be traversed first in the following algorithm before traversing a specific view list 403.

Step 720

Likewise, if V is equal to 0, VU must be used to determine which managed object in the managed object list 401 is being referred to in case the view is starting with an unexpanded sibling of the managed object's view list 403 that is to be traversed.

If V is equal to an index from the original tree descriptor string (TDS) 109 find all children of V. For each child, go in ascending order of indexes, placing the child in the TDA.

Step 730

Then compare its index with any of the indexes in the original TDS. If the indexes match find its children and repeat the above process.

Step 735

Continue this process until all children of all expanded nodes have been found or the TDA is full.

Step 745

If all siblings have been added and the list is not full, move back to the previous level and continue to add siblings. Repeat this process until the TDA is full or all children of V have been traversed.

If V is not equal to an index but is greater than that index check V against the next index. If there are no more indexes to compare to V was not expanded and there will be no children of V to add to the TDA. If V is found to be greater than one index but less than another then V was not expanded and there will be no children of V to add to the TDA.

Step 740

On the lowest level, continue to add siblings to the TDA until all siblings have been added or the TDA is full.

If all siblings of V have been traversed or there are no siblings of V to traverse determine if there are any siblings of V's Parent with an index higher than V. If there are, sequence in ascending order of indexes, placing the sibling in the TDA, then compare its index with any of the indexes in the original TDS.

Step 715

If the indexes match find its children and for each child, go in ascending order of indexes, placing the child in the TDA, then comparing its index with any of the indexes in the original TDS.

Step 745

Continue this process until all children of all expanded nodes have been found or the TDA is full. On the lowest level, continue to add siblings to the list until all siblings have been added or the TDA is full.

Step 750

If all siblings have been added and the TDA is not full, move back to the previous level and continue to add siblings. Repeat this process until the TDA is full or all siblings of V's Parent have been traversed.

Step 760

Until the TDA is full, a node does not have a parent (managed objects do not have parents) or there are no nodes left in the tree repeat the process with the parent of the just traversed node.

Step 735

As children are found the count of children for an index should be checked and changed if different from what was in the previous TDS. If an expanded child's sibling index is different from what was in the previous TDS it should be changed. In the unusual case where the TDA is not full and the tree below V has been completely traversed, a new V must be found with an index lower than the current V. The node that becomes the new V will be based on how many view slots are left in the TDA and how the tree has been expanded above the current V.

[End of Building the Tree Descriptor Array]

Building the Tree Descriptor String

Figure 8:
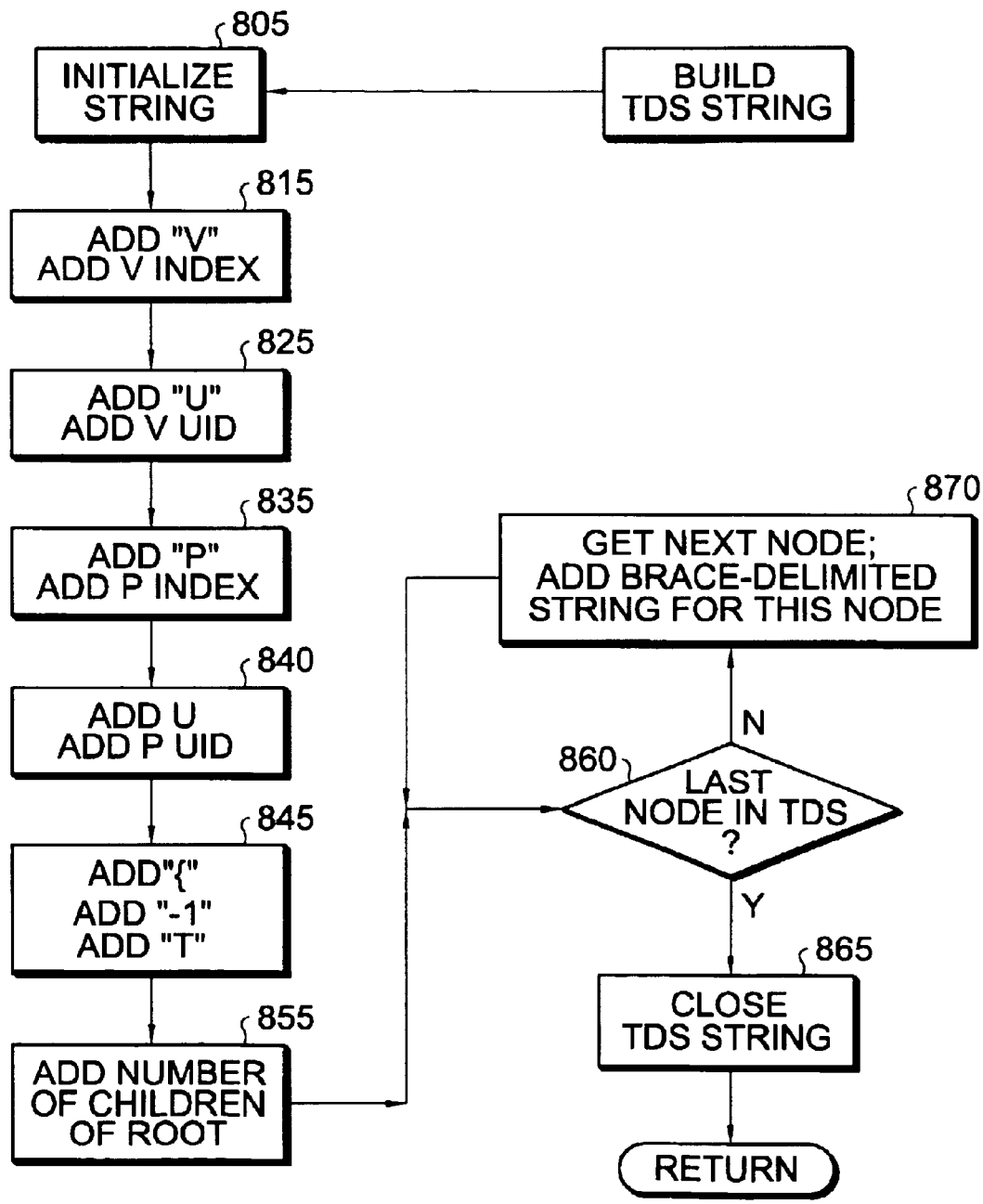
FIG. 8 is a flowchart showing exemplary steps performed in building a tree descriptor string.

FIG. 8 is a flowchart showing exemplary steps performed in building a tree descriptor string. The steps listed below are illustrated by the blocks appearing in FIG. 8.

Step 805

Since the TDS 109 is a string, start with a new (null) string.

Step 815

Add the letter V followed by the index value of V formatted as text in decimal.

Step 825

Add the letter U followed by the UID of V formatted as text in hexadecimal.

Step 835

Add the letter P followed by the index value of P formatted as text in decimal.

Step 840

Add the letter U followed by the UID of P formatted as text in hexadecimal.

Step 845

Add an open brace ({) followed by the value of I[0] (should be −1) formatted as text in decimal.

Step 855

Add the letter T followed by the value of T[0] formatted as text in decimal. If the value of the counter variable EN is greater than 1 initialize a brace variable (BR=1) to 1 to keep track of the number of open braces. Otherwise add a closing brace (}) to complete the TDS.

Step 870

Initialize a temporary variable to 1 (TV=1). Add an open brace ({) followed by the value of I[TV] formatted as text in decimal. Add 1 to BR. Add the letter S followed by the value of S[TV] formatted as text in decimal. Add the letter T followed by the value of T[TV] formatted as text in decimal. If the value of PA[TV] is false add a closing brace and subtract 1 from BR

Step 860

Add 1 to TV and compare it to EN.

Step 865

If they are equal, check the value of BR. If BR is greater than 0 repeat the following: add a closing brace and subtract 1 from BR.

Step 860

If the value of PA[TV] is true add 1 to TV and compare it to EN.

Step 870

If TV and EN are equal there is a problem. Otherwise, repeat the above process starting at the beginning of this paragraph.

[End of Building the Tree Descriptor String]

While preferred embodiments of the present invention have been shown in the drawings and described above, it will be apparent to one skilled in the art that various embodiments of the present invention are possible. For example, the specific tree structures, data structures and formats, and algorithmic steps presented herein should not be construed so as to limit the embodiments described herein. Modification may be made to these and other specific elements of the invention without departing from its spirit and scope as expressed in the following claims.

We claim:

1. A system for transferring information in a computer network from a server to a client computer, the information including a plurality of hierarchically related objects, wherein a viewable subset of the objects is displayed on a display device connected to the client computer in the form of a navigable tree having expandable nodes, the viewable subset being visible in a navigation pane on the display device, tho system comprising:

a tree descriptor array comprising information describing each of the objects to be displayed in the navigation pane; and a tree descriptor string comprising information describing a hierarchical structure of expanded nodes in the tree;

wherein the tree descriptor array and the tree descriptor string are sent from the server to the client computer; and wherein the tree descriptor string comprises a list of only those said expandable nodes which are to be expanded and displayed on the display device.

2. The system of claim 1, further including:

a managed object list comprising an entry for each of a plurality of managed objects in the navigable tree; and a view list comprising a plurality of indicia of object data records, each of which represents a child of one of the managed objects corresponding to an entry in the managed object list;

wherein each said entry in the managed object list comprises indicia of an entry in the view list.

3. The system of claim 2, wherein each one of the object data records include information comprising:

a Universal Identifier for the object to which a given said one of the object data records corresponds; and a Universal Identifier for the parent of the object to which a given said one of the object data records corresponds.

4. The system of claim 1, wherein the tree descriptor array comprises information for each object in the subset of the objects to be displayed, including:

a Universal Identifier of the object;

a first index indicating the relative position of the object in the navigable tree, at which a tree segment starts; and a second index indicating the relative tree position of the object from its managed object.

5. The system of claim 4, wherein the tree descriptor array further comprises:

a first string indicating whether the object is expandable; and a second string indicating whether the object is presently expanded.

6. The system of claim 1, wherein the tree descriptor string further comprises a representation of the hierarchical structure of open containers in the part of the tree that is being displayed.

7. The system of claim 6, wherein the tree descriptor string further comprises indicia of the location of a cursor on the display device.

8. The system of claim 7, wherein the tree descriptor string further comprises indicia of the state of nodes in the displayed segment of the navigation tree including whether a node comprising a folder is open.

9. The system of claim 1, wherein the client computer uses information in the tree descriptor string to render a view that includes one expanded node of said expandable nodes.

10. The system of claim 9, wherein the client computer also uses information in the tree descriptor array to render a view that includes said nodes which are to be expanded.

11. The system of claim 1, wherein, in response to a user of the client computer clicking on one of said expandable nodes, the client computer sends information via the tree descriptor string to the server identifying the node to be expanded.

12. The system of claim 1, wherein the list contained in the tree descriptor string contains a list of those said nodes which are to be expanded and displayed on the display device.

13. A system for transferring information in a computer network from a server to a client computer, the information including a plurality of hierarchically related objects, wherein a viewable subset of the objects is displayed on a display device connected to the client computer in the form of a navigable tree having expandable nodes represented by container objects, the viewable subset being visible in a navigation pane on the display device, the system comprising:

a tree descriptor array comprising information describing each of the objects to be displayed in the navigation pane; and a tree descriptor string comprising information describing a hierarchical structure of said container objects that are open;

wherein the tree descriptor array and the tree descriptor string are sent from the server to the client computer; and wherein the tree descriptor string contains a list of only those said container objects which have been opened.

14. The system of claim 13, further including:

a managed object list comprising an entry for each of a plurality of managed objects in the navigable tree; and a view list comprising a plurality of indicia of object data records, each of which represents a child of one of the managed objects corresponding to an entry in the managed object list;

wherein each said entry in the managed object list comprises indicia of an entry in the view list.

15. The system of claim 14, wherein each one of the object data records include information comprising:

a Universal Identifier for the object to which a given said one of the object data records corresponds; and a Universal Identifier for the parent of the object to which a given said one of the object data records corresponds.

16. The system of claim 13, wherein the tree descriptor array comprises information for each object in the subset of the objects to be displayed, including:

a Universal Identifier of the object;

a first index indicating the relative position of the object in the navigable tree, at which a tree segment starts; and a second index indicating the relative tree position of the object from its managed object.

17. The system of claim 16, wherein the tree descriptor array further comprises:

a first string indicating wherein the object is expandable; and a second string indicating whether the object is presently expanded.

18. The system of claim 13, wherein the tree descriptor string further comprises a representation of the hierarchical structure of open containers in the part of the tree that is being displayed.

19. The system of claim 18, wherein the tree descriptor string further comprises indicia of the location of a cursor on the display device.

20. A method for transferring information in a computer network from a server to a client computer, the information including a plurality of hierarchically related objects, wherein a viewable subset of the objects is displayed on a display device connected to the client computer in the form of a navigable tree having expandable nodes, the viewable subset being visible in a navigation pane on the display device, the method composing the steps of:

sending, from the client computer to the server, tree descriptor information describing a hierarchical structure of the nodes that are to be expanded;

determining a tree segment to be displayed in the navigation pane in response to the tree descriptor information received from the client computer; and sending, from the server to the client computer, a list of each of the objects in the tree segment to be displayed, and information describing each of the objects to be displayed;

wherein said tree descriptor information comprises a list of only the nodes that are to be expanded.

21. The method of claim 20, wherein said information describing each of the objects to be displayed comprises information including:

a Universal Identifier of the object;

a first index indicating the relative position of the object in the navigable tree, at which a tree segment starts; and a second index indicating the relative tree position of the object from its managed object.

22. The system of claim 21, wherein said information describing each of the objects to be displayed further comprises:

a first string indicating whether the object is expandable; and a second string indicating whether the object is presently expanded.

23. The system of claim 20, wherein the tree descriptor information further comprises a representation of the hierarchical structure of open containers in the part of the tree that is being displayed.

24. The system of claim 23, wherein the tree descriptor information further comprises indicia of the location of a cursor on the display device.

25. The system of claim 24, wherein the tree descriptor information further comprises indicia of the state of nodes in the displayed segment of the navigation tree including whether a node comprising a folder is open.

26. The method of claim 20, further comprising the step of initially sending, in response to a user of the client computer clicking on one of said expandable nodes, information identifying the node to be expanded.

27. A method for transferring information in a computer network from a server to a client computer, the information including a plurality of hierarchically related objects, wherein a viewable subset of the objects is displayed on a display device connected to the client computer in the form of a navigable tree having expandable nodes, the viewable subset being visible in a navigation pane on the display device, the method comprising the steps of:

generating a tree descriptor array comprising information describing each of the objects to be displayed in the navigation pane;

generating a tree descriptor string comprising information describing a hierarchical structure of expanded nodes in the tree; and sending the tree descriptor array and the tree descriptor string from the server to the client computer;

wherein the tree descriptor string comprises a list of only those said nodes which are to be expanded and displayed on the display device.

* * * * *

UNITED STATES PATENT AND TRADEMARK OFFICE
CERTIFICATE OF CORRECTION

| | | |
|---|---|---|
| PATENT NO. | : 6,961,909 B2 | Page 1 of 1 |
| APPLICATION NO. | : 09/755740 | |
| DATED | : November 1, 2005 | |
| INVENTOR(S) | : Bob Lord et al. | |

It is certified that error appears in the above-identified patent and that said Letters Patent is hereby corrected as shown below:

In column 20, line 62, in Claim 1, delete "tho" and insert -- the --, therefor.

In column 22, line 39, in Claim 17, delete "wherein" and insert -- whether --, therefor.

In column 22, line 57, in Claim 20, delete "composing" and insert -- comprising --, therefor.

Signed and Sealed this

Thirteenth Day of July, 2010

David J. Kappos
*Director of the United States Patent and Trademark Office*